US007858917B2

(12) United States Patent
Stern et al.

(10) Patent No.: US 7,858,917 B2
(45) Date of Patent: Dec. 28, 2010

(54) DIGITAL PHOTON-COUNTING GEIGER-MODE AVALANCHE PHOTODIODE SOLID-STATE MONOLITHIC INTENSITY IMAGING FOCAL-PLANE WITH SCALABLE READOUT CIRCUITRY

(75) Inventors: Alvin Stern, Newton, MA (US); Brian F. Aull, Cambridge, MA (US); Bernard B. Kosicki, Acton, MA (US); Robert K. Reich, Tyngsborough, MA (US); Bradley J. Felton, Lowell, MA (US); David C. Shaver, Carlisle, MA (US); Andrew H. Loomis, Westford, MA (US); Douglas J. Young, Stoneham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1430 days.

(21) Appl. No.: 10/836,896

(22) Filed: Apr. 30, 2004

(65) Prior Publication Data

US 2005/0012033 A1 Jan. 20, 2005

Related U.S. Application Data

(60) Provisional application No. 60/467,336, filed on May 2, 2003.

(51) Int. Cl.
*G01J 1/44* (2006.01)
*H01J 40/14* (2006.01)
*H03F 3/08* (2006.01)

(52) U.S. Cl. .............................. 250/214 R; 250/208.1; 250/214.1; 348/302; 348/308

(58) Field of Classification Search ............. 250/208.1, 250/214 R, 214.1; 348/302, 308
See application file for complete search history.

(56) References Cited

U.S. PATENT DOCUMENTS

| | | | | |
|---|---|---|---|---|
| 5,532,474 | A * | 7/1996 | Dautet et al. | 250/214 R |
| 5,665,959 | A * | 9/1997 | Fossum et al. | 250/208.1 |
| 5,892,575 | A * | 4/1999 | Marino | 356/5.01 |
| 6,940,589 | B1 * | 9/2005 | Suyama et al. | 356/213 |
| 2004/0245592 | A1 * | 12/2004 | Harmon et al. | 257/438 |

OTHER PUBLICATIONS

Albota et al, "Three-Dimensional Imaging Laser Radars with Geiger-Mode Avalanche Photodiode Arrays", 2002, Lincoln Laboratory Journal, vol. 13, No. 2, pp. 351-370.*

"Geiger-mode avalanche photodiodes for three-dimensional imaging," Aull et al., *Lincoln Laboratory J.* vol. 13, n. 2 (2002).

"An Integrated Active-Quenching Circuit for Single-Photon Avalanche Diodes," Zappa et al., *IEEE Transactions on Instrumentation & Measurement*, vol. 49, n. 6, (Dec. 2000).

"Geiger-mode avalanche photodiode arrays integrated with CMOS timing circuits," Aull et al., *56th Annual Device Research Conference* (1998).

* cited by examiner

*Primary Examiner*—Georgia Y Epps
*Assistant Examiner*—Francis M Legasse, Jr.
(74) *Attorney, Agent, or Firm*—Gauthier & Connors LLP

(57) ABSTRACT

A photon-counting Geiger-mode avalanche photodiode intensity imaging array includes an array of pixels, each having an avalanche photodiode. A pixel senses an avalanche event and stores, in response to the sensed avalanche event, a single bit digital value therein. An array of accumulators are provided such that each accumulator is associated with a pixel. A row decoder circuit addresses a pixel row within the array of pixels. A bit sensing circuit converts a precharged capacitance into a digital value during read operations.

70 Claims, 13 Drawing Sheets

DIGITAL PHOTON-COUNTING GEIGER-MODE AVALANCHE PHOTODIODE SOLID-STATE MONOLITHIC INTENSITY IMAGING FOCAL-PLANE WITH SCALABLE READOUT CIRCUITRY

PRIORITY INFORMATION

This application claims priority from U.S. Provisional Patent Application, Ser. No. 60/467,336, filed on May 2, 2003. The entire contents of U.S. Provisional Patent Application, Ser. No. 60/467,336 are hereby incorporated by reference.

GOVERNMENT RIGHTS NOTICE

The present invention was made with government support under Grant (Contract) Number, F19628-00-C-0002, awarded by Department of the Air Force. The Government has certain rights to this invention.

FIELD OF THE PRESENT INVENTION

The present invention is directed to an all digital photon-counting Geiger-mode avalanche photodiode intensity imaging solid-state monolithic focal plane. More particularly, the present invention is directed to the integration of Geiger-mode avalanche photodiodes with high-speed digital readout integrated circuits so as to provide digital photon-counting focal-plane array intensity imagers

BACKGROUND OF THE PRESENT INVENTION

Various conventional architectures supporting a two-dimensional array of avalanche photodiodes in a photon-counting environment have been proposed. One such conventional architecture is the MOSFET matrix architecture. An example of this architecture is illustrated in FIG. 13.

As illustrated in FIG. 13, the pixels 500 of an array are connected to row lines through MOSFET transistors 510. Each row line is biased above breakdown by bias/sense circuits 505. By applying a charging pulse to the gates of the transistors 510 in a column, the entire column of avalanche photodiodes 500 can be biased above breakdown.

If breakdown is started in a pixel 500, the pixel 500 will be discharged by the breakdown current. This breakdown will quench automatically when the voltage has dropped below the breakdown voltage. If a charge pulse is subsequently applied to the gate of the transistor 510 in a column, the pixel 500 can be recharged.

In this device, if a photon initiated the avalanche breakdown, a large charge will be required to recharge the pixel 500. If no photon has been detected by the pixel 500, no current will flow through the row line of the pixel 500. By continuously scanning the pixel 500 and the surrounding array of pixels, a multitude of 1-bit images can be accumulated and added together to generate an image with many grey-values.

The MOSFET architecture also includes column select circuitry 501 to select the column of pixels to scan or sense and I/O circuitry 507 to gate the image data-from the row lines off the chip. The column select circuitry 501 and the I/O circuitry 507 are controlled by control circuitry 503.

Another conventional architecture supporting two-dimensional arrays of avalanche photodiodes in a photon-counting environment is the diode matrix architecture. An example of this architecture is illustrated in FIG. 14.

As illustrated in FIG. 14, each pixel 600 is connected to a column line through diode 620 and a row line through diode 610. Both lines are biased at a voltage larger than the breakdown voltage of the corresponding diode. If a photon is detected by one of the pixels 600, the breakdown current of the pixel 600 will flow through the column line and row line contacting the pixel 600. The diodes contacting the other pixels prevent the current from flowing into other column lines and row lines.

By detecting the currents through the column lines and the row lines, the position of the incident photons can be determined. After breakdown, quench circuits 630 reduce the voltages at the column and row lines associated with the pixel currently experiencing breakdown.

The diode architecture also includes I/O circuitry 507 to gate the image data from the column and row lines off the chip.

In looking at these conventional architectures, a high timing resolution can be realized by the diode matrix architecture. On the other hand, large photon count rates can be realized by the MOSFET matrix architecture. However, neither of these conventional architectures can realize both a high timing resolution and large photon count rates.

Therefore, it is desirable to realize a read-out architecture that enables a high timing resolution and large photon count rates. Moreover, it is desirable to realize a read-out architecture that enables the realization of real-time digital photon-counting focal-plane-array intensity imagers that are applicable to night vision, remote surveillance, adaptive optics, biodetection, micro air vehicles, satellites, and bio-fluorescence.

SUMMARY OF THE PRESENT INVENTION

A first aspect of the present invention is a method of converting detection of a photon to a digital value. The method senses an avalanche event in an avalanche photodiode of an active quenching pixel and stores, in response to the sensed avalanche event, a single bit digital value in the pixel.

A second aspect of the present invention is a method of converting photons detected by a focal plane array of pixels to a single-bit digital values, each pixel having an avalanche photodiode. The method senses an avalanche event in the avalanche photodiode of each active quenching pixel and stores, in response to the sensed avalanche event, a single bit digital value in the pixel.

A third aspect of the present invention is an imager having a photon-counting Geiger-mode avalanche photodiode intensity imaging solid-state monolithic focal plane array. The imager includes an array of pixels, each having an avalanche photodiode; an array of accumulators, each accumulator being associated with a pixel; a row decoder circuit to address a pixel row within the array of pixels; and a bit sensing circuit to convert a precharged capacitance into a digital value during read operations. The active quenching circuit in the pixel senses an avalanche event in its associated avalanche photodiode and stores, in response to the sensed avalanche event, a single bit digital value therein.

A fourth aspect of the present invention is an imager having a photon-counting Geiger-mode avalanche photodiode intensity imaging solid-state monolithic focal plane array. The imager includes an array of pixels, each having an avalanche photodiode; an array of accumulators, each accumulator being associated with a pixel; the pixels sensing an avalanche event in its associated avalanche photodiode and storing, in response to the sensed avalanche event, a single bit digital value therein; a first set of state machines to control a transfer of said single bit digital value from said pixel to said accumulator; and a second set of state machines to control a transfer of said single bit digital value from said accumulator off-chip.

A fifth aspect of the present invention is a photon counting intensity imager that includes a Geiger-mode avalanche photodiode pixel imaging array and a scalable readout integrated circuit.

A sixth aspect of the present invention is an imager having a photon-counting Geiger-mode avalanche photodiode intensity imaging array. The imager includes an array of pixels, each having an avalanche photodiode and a pixel D-flip flop circuit, intra-dimensional pixel D-flip flops being serially chained together to form a plurality of clockable pixel shift registers, and an array of accumulators, each accumulator being operatively connected to one of the plurality of clockable pixel shift registers, each accumulator being associated with a pixel. The pixels sense an avalanche event in its associated avalanche photodiode and store, in response to the sensed avalanche event, a single bit digital value therein.

A seventh aspect of the present invention is an imager having a photon-counting Geiger-mode avalanche photodiode intensity imaging array. The imager includes an array of pixels, each having an avalanche photodiode and a pixel D-flip flop circuit, intra-dimensional pixel D-flip flops being serially chained together to form a plurality of clockable pixel shift registers; an array of accumulators, each accumulator being operatively connected to one of the plurality of clockable pixel shift registers, each accumulator being associated with a pixel; and a first set of state machines to control a transfer of the single bit digital value from the pixel to the accumulator. The pixels sense an avalanche event in its associated avalanche photodiode and store, in response to the sensed avalanche event, a single bit digital value therein.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

Figure 1:
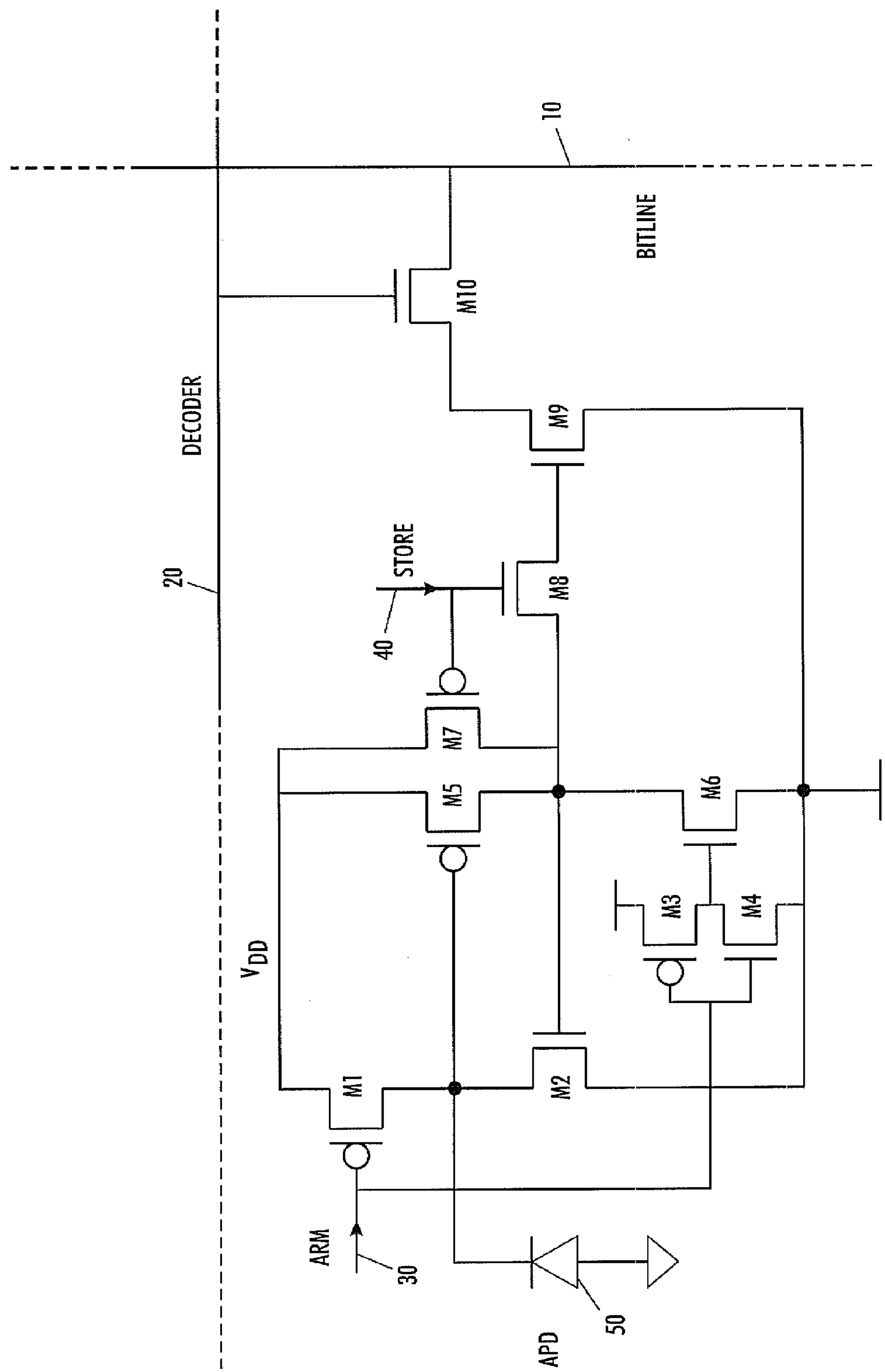
FIG. 1 illustrates one embodiment of a circuit diagram of a 1-bit active quenching pixel according to the concepts of the present invention.

The present invention will be described in connection with specific embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

Photon counting imagers have been distinguished from other solid state sensors by the absence of readout noise, since data are directly collected in digital form. By collecting the data in digital form, no equivalent analog-to-digital conversion of an electric signal is needed. In such devices, a single photon detected by an avalanche photodiode is sufficient to generate a digital signal level that will trigger a CMOS circuit, thereby allowing direct photon-to-digital conversion to take place in the pixel.

As noted above, it is desirable to realize a read-out architecture that enables a high timing resolution and large photon count rates. In realizing such an architecture, the present invention provides a scalable integrated circuit architecture that supports photon-counting intensity-imaging avalanche photodiode arrays. More specifically, the present invention, as described in more detail below, provides support for high-pixel-count, high frame rate imaging arrays.

The present invention provides digital photon-counting Geiger-mode avalanche photodiode intensity imaging solid-state focal plane. With this imager, the present invention captures digital images directly with no readout noise at very high frame rates with much improved low-light sensitivity. Such characteristics of the present invention enables the present invention to be utilized in studying phenomena in science and astronomy that occur at very short time scales and low-light level that cannot be captured in an image with current imaging technology.

The in-pixel digitization of single photons with no readout noise by the implementation of the present invention also enables cross-correlation of successive frames, thereby eliminating the adverse effects of camera platform jitter that leads to blurred images such as when taking photographs from any type of moving or vibrating platform, such as a moving car or a satellite orbiting the earth in outer space.

The present invention provides a high-speed scalable circuit architecture that supports avalanche photodiode arrays in a true all-digital photon-counting intensity imager. Moreover, the present invention provides a circuit architecture that realizes high timing resolution, large photon counting rates on the order of $10^7$ photons per second or greater, wide dynamic ranges, zero-imaging dead time, and/or on-chip signal processing.

The basic imager architecture of the present invention has a single bit in the pixel that records the detection of a photon and an array of accumulators outside the imaging array that integrates (counts) the detected photons per readout event.

FIG. 1 shows one embodiment, according to the concepts of the present invention, of a pixel circuit, using ten transistors, that digitally stores a single bit of information indicating whether or not a photon was detected by the avalanche photodiode between interrogations. In a preferred embodiment of the implementation, the circuit is designed in a 0.35-μm CMOS process, resulting in a pixel with a length of 15 μm on a side.

The pixel circuit of FIG. 1 performs the functions of arming the avalanche photodiode 50 through arming signal 30, actively quenching the avalanche photodiode 50 if it is triggered within a set gate time, storing the bit value through storing signal 40, and disarming the avalanche photodiode 50 after the set gate time. Limiting the pixel storage to just one bit allows necessary control of the dead time of the avalanche photodiode 50 (the time the avalanche photodiode 50 must "rest" after having avalanched).

However, single-bit pixel storage does require an architecture able to rapidly revisit the pixel 50 (~$10^7$ Hz, comparable to the avalanche photodiode dead time) to determine its state. With each revisit cycle, the on-chip accumulator corresponding to pixel 50 is updated. The final accumulator result is the number of times the pixel 50 has avalanched between off chip readout events from the accumulators or data transfers to secondary frame storage for on-chip signal processing.

The pixel circuit of FIG. 1 operates by dynamically storing the data bit on the gate of transistor M9, which is read out from the pixel 50 through the bitline 10 as an inverted value when the decoder line 20 addressing that pixel row switches high. A high value stored on the gate of M9 indicates that the avalanche photodiode fired and will turn ON transistor M9, thereby discharging the bitline's capacitance through the series combination of M9 and M10 when that pixel row is accessed by a read operation.

As further illustrated in FIG. 1, the avalanche photodiode 50 is connected to a terminal of transistor M1, a terminal of transistor M2, and a gate of transistor M5. The other terminal of transistor M1 and a terminal of transistor M5 are connected to $V_{DD}$. The other terminal of transistor M5 is connected to the gate of transistor M2.

The ARM signal 30 is connected to the gates of transistors M1, M3, and M4. The other terminal of transistor M2 is connected to a terminal of transistor M6, and the other terminal of transistor M6 is connected to the gate of transistor M2. A transistor M7 is connected between $V_{DD}$ and the gate of transistor M2 with its gate connected to a STORE signal 40. Lastly, transistor M8 is connected between the gate of transistor M2 and the gate of transistor M9 with its gate connected to a STORE signal 40.

Figure 2:
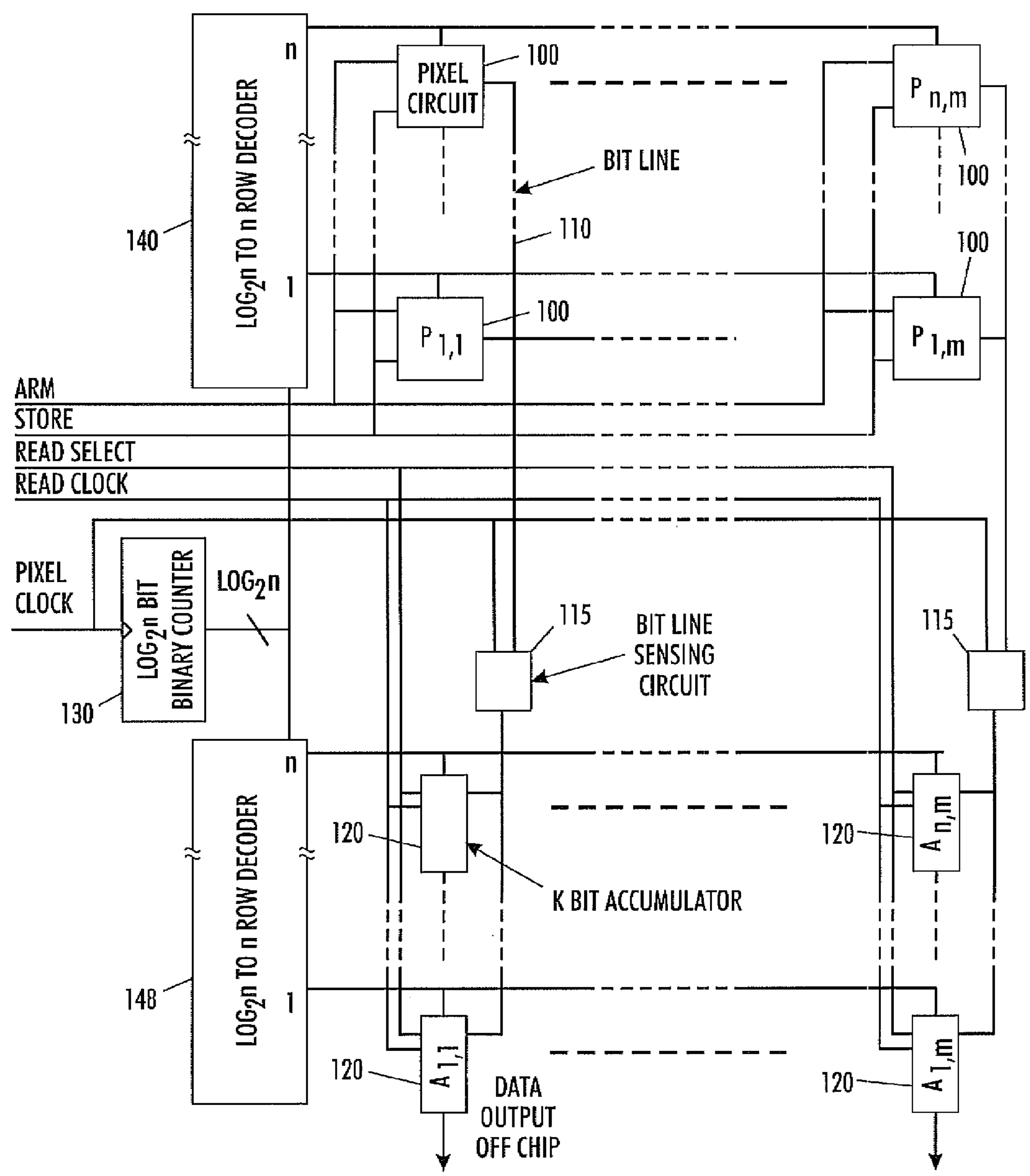
FIG. 2 illustrates one embodiment of a block diagram of a basic imager readout circuit for an array of avalanche photodiodes according to the concepts of the present invention.

FIG. 2 shows a basic block diagram of the readout circuit architecture that supports pixel circuit of FIG. 1.

As illustrated in FIG. 2, the pixels 100 are arrayed in a matrix of n rows by m columns and are addressed using a row decoder 140 with n outputs. Photon-counting accumulators 120 are also arrayed in a matrix of n rows by m columns. The photon-counting accumulators 120 are shown being addressed using a separate row decoder 148 with n outputs. It is noted that a single decoder could be used to address both the pixel and accumulator arrays.

A binary counter 130 drives the two decoders (single decoder) simultaneously. Bitline-sensing circuits 115 placed between each column of pixels 100 and the associated accumulators 120 quickly converts the precharged capacitance of the bitline (i.e., bitline 10 of FIG. 1) into a digital value of zero or one during read operations.

Figure 3:
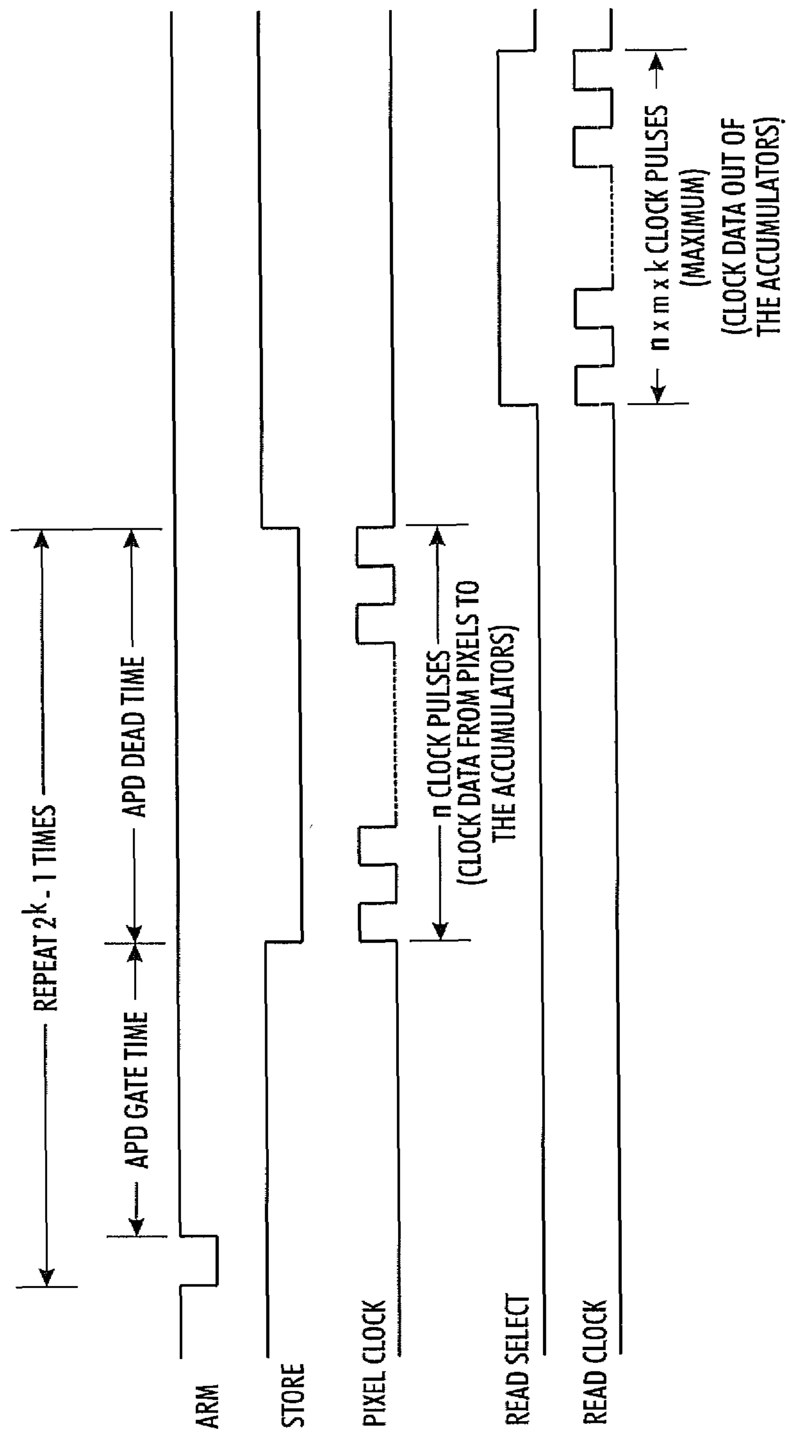
FIG. 3 illustrates control signal and clocking waveforms for the imager readout circuit of FIG. 2 according to the concepts of the present invention.

During normal imager operations, either an on-chip or off-chip programmable state machine supplies the control and clocking signals that are shown in FIG. 3 to the pixels 100 and the associated accumulators 120.

The avalanche photodiodes in the pixel array are gated ON synchronously when a global ARM signal (i.e., ARM signal 30 of FIG. 1) pulses low. At this point, each avalanche photodiode can be discharged by the avalanche multiplication of an electron-hole pair generated either by an absorbed photon or thermally.

A STORE signal (i.e., STORE signal 40 of FIG. 1), distributed synchronously to all the pixels 100, transitions low at the end of the gate time interval causing a data bit in the pixel to be stored. Subsequently the avalanche photodiode is disarmed, marking the start of the avalanche photodiode dead time.

The pixel data are then read out to an array of on-chip accumulators 120, located outside the imaging area. Each accumulator 120 counts the number of photons that have been detected by its corresponding avalanche photodiode between off-chip read cycles or on-chip data transfer to the secondary frame store from the accumulators 120.

The avalanche photodiode in FIG. 1 is actively quenched by the positive feedback circuit formed by p-channel transistor M5 and n-channel transistor M2. The avalanche photodiode from a circuit standpoint behaves as a capacitor and a resistor in parallel. When a photon hits the detector and an avalanche is initiated, the charge stored on the capacitor begins to flow through the resistor (actually the avalanche photodiode junction) in parallel with it, and the voltage across the capacitor begins to drop as a result.

The p-channel transistor M5 senses that drop in voltage across the capacitor, and when the voltage has dropped ~0.5 V, which corresponds roughly to the threshold voltage of M5, the transistor is turned ON and begins to charge up the gate of transistor M2. When a sufficient voltage builds up on the gate of M2, the transistor begins to conduct, and now part of the charge stored on the capacitor that represents the avalanche photodiode will flow to ground not via the resistor in parallel with the capacitor but rather through the n-channel transistor which has been made to conduct.

By using M5 to sense the onset of an avalanche in the avalanche photodiode quickly enough, it is possible to turn ON M2, and divert the charge stored on the avalanche photodiode capacitance from flowing through the avalanche photodiode junction and instead to flow via transistor M2 to ground. This action decreases the time required for the carriers to be swept out and limits recombination in the avalanche photodiode junction, since less of the shared charge goes through the junction, but is otherwise diverted via M2 to ground.

When the store-disarm signal (the STORE signal 40 in FIG. 1) makes a high-to-low transition, the bit value representing whether the avalanche photodiode avalanched or not while it was gated ON, is stored on the gate of M9. At the same time p-channel transistor M7 is turned ON, which subsequently turns ON n-channel transistor M2, which disarms the avalanche photodiode if M2 was not turned ON already by an avalanche that was sensed by M5.

For reliable operation, transistor M8 is designed slower than M7, thereby increasing the tolerance of the pixel circuit to slower STORE signal edges. The disarming of the avalanche photodiode means that its cathode voltage is brought below the breakdown voltage of the device, marking the beginning of the avalanche photodiode dead time or quench time.

Regardless of whether the avalanche photodiode avalanched or not while it was armed, the STORE signal stores that value on the gate of M9 and subsequently disarms the avalanche photodiode marking the same start point for the dead time for all avalanche photodiodes in the array, since STORE is globally distributed to all avalanche photodiodes.

When STORE is brought high again, the ARM signal can be pulsed low, initiating the process all over again. The avalanche photodiode dead time for all pixels is therefore at least the time interval between the high-to-low transition of STORE and the ARM pulse that rearms the avalanche photodiode.

The timing diagram in FIG. 3 is specific for the pixel circuit of FIG. 1. It is worth noting that the disarming of all pixels prior to readout of the entire array is primarily to allow very deterministic conditions to be set for the avalanche photodiodes, and to allow accurate measurements on the array. In fact, it is not necessarry to disarm the entire pixel array before transfering the pixel data to the accumulators, thereby allowing much higher duty cycle of the avalanche photodiodes in their armed state, and a higher effective detectivity of the array.

Figure 4:
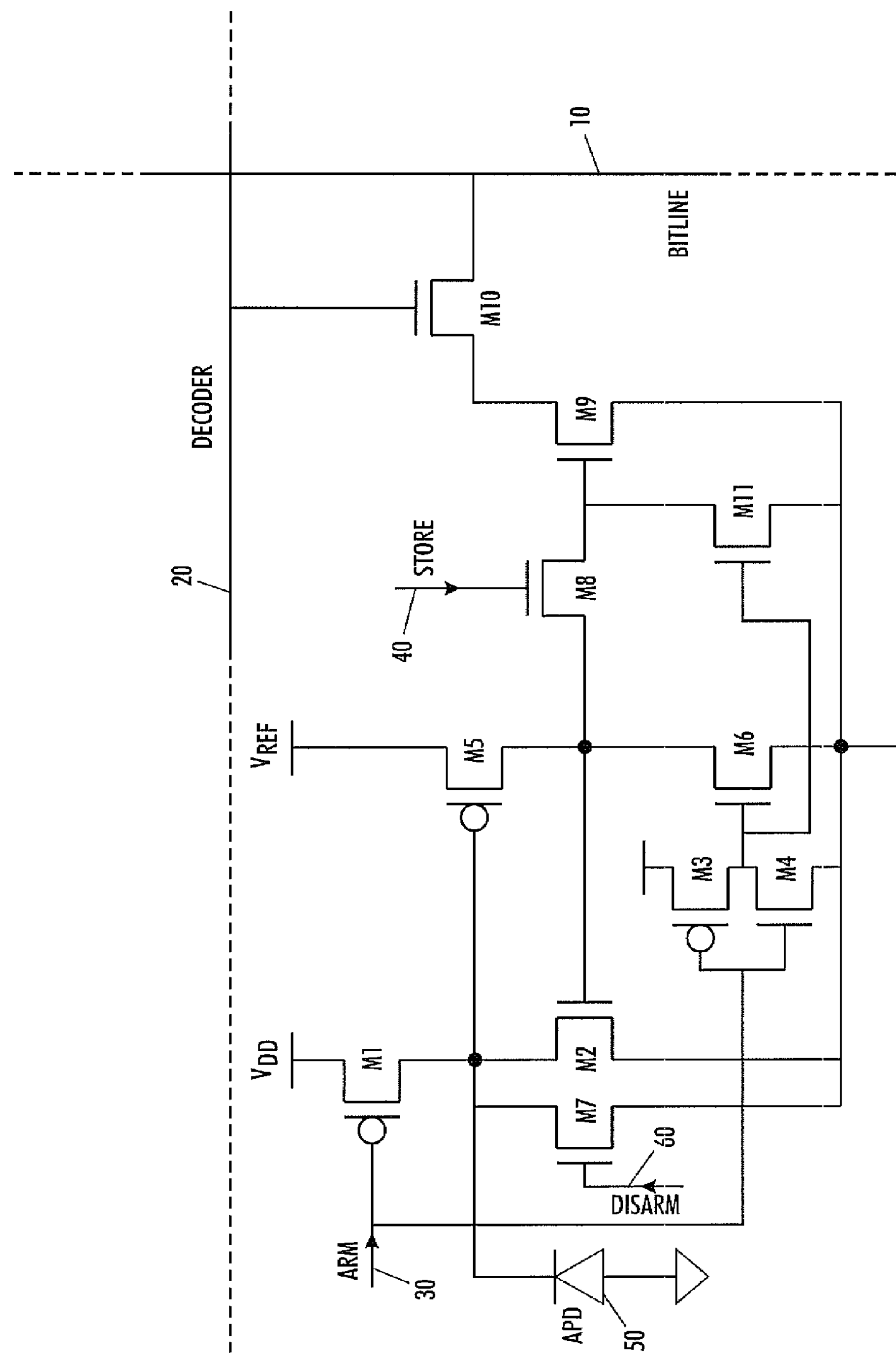
FIG. 4 illustrates another embodiment of a circuit diagram of a 1-bit active quenching pixel according to the concepts of the present invention.

FIG. 4 shows another embodiment, according to the concepts of the present invention, of a pixel circuit, using eleven transistors, that digitally stores a single bit of information indicating whether or not a photon was detected by the avalanche photodiode between interrogations. In this embodiment, data in the pixel is stored without disarming the avalanche photodiode 50. This feature is useful as a power saving measure when imaging at low light levels when most avalanche photodiodes do not avalanche during a gate ON interval.

The pixel circuit of FIG. 4 performs the functions of arming the avalanche photodiode 50 through arming signal 30, actively quenching the avalanche photodiode 50 if it is triggered within a set gate time, storing the bit value through storing signal 40, and optionally disarming the avalanche photodiode 50 after the set gate time. Limiting the pixel storage to just one bit allows necessary control of the dead time of the avalanche photodiode 50 (the time the avalanche photodiode 50 must “rest” after having avalanched).

However, single-bit pixel storage does require an architecture able to rapidly revisit the pixel 50 (~$10^7$ Hz, comparable to the avalanche photodiode dead time) to determine its state. With each revisit cycle, the on-chip accumulator corresponding to pixel 50 is updated. The final accumulator result is the number of times the pixel 50 has avalanched between off chip readout events from the accumulators or data transfers to secondary frame storage for on-chip signal processing.

The pixel circuit of FIG. 4 operates by dynamically storing the data bit on the gate of transistor M9, which is read out from the pixel 50 through the bitline 10 as an inverted value when the decoder line 20 addressing that pixel row switches high. A high value stored on the gate of M9 indicates that the avalanche photodiode fired and will turn ON transistor M9, thereby discharging the bitline’s capacitance through the series combination of M9 and M10 when that pixel row is accessed by a read operation.

As further illustrated in FIG. 4, the avalanche photodiode 50 is connected to a terminal of transistor M1, a terminal of transistor M2, a terminal of transistor M7, and a gate of transistor M5. The other terminal of transistor M1 is connected to $V_{DD}$. A terminal of transistor M5 is connected to $V_{REF}$. The other terminal of transistor M5 is connected to the gate of transistor M2.

The ARM signal 30 is connected to the gates of transistors M1, M3, and M4. The other terminal of transistor M2 is connected to a terminal of transistor M6, and the other terminal of transistor M6 is connected to the gate of transistor M2. A transistor M7 is connected between the avalanche photodiode 50 and a terminal of transistor M6 with its gate connected to a DISARM signal 60. Transistor M8 is connected between the gate of transistor M2 and the gate of transistor M9 with its gate connected to a STORE signal 40.

Lastly, transistor M11 is connected between a terminal of transistor M8 and a terminal of transistor M6 with its gate connected to the gate of transistor M6.

FIG. 4 which illustrates an eleven transistor variant of a pixel which does not automatically disarm the avalanche photodiode when storing a digital value. Functionally, it is equivalent to the pixel of FIG. 1. The pixel of FIG. 4 is shown with a variable DC supply pin $V_{REF}$ connected to the source of M5 which allows the setting of a variable threshold level for when the active quenching circuit is triggered by the sensing of an avalanche in the avalanche photodiode by transistor M5. Making $V_{REF}$ slightly larger than $V_{DD}$, the onset of an avalanche in the avalanche photodiode will be sensed earlier by M5 than if $V_{REF}$ is set equal to $V_{DD}$. Fine tuning $V_{REF}$ will yield fast sensing of an avalanche and quick triggering of the active quenching circuit in the pixel, thereby helping to reduce the total charge transitioning the avalanche photodiode junction. This will improve avalanche photodiode performance by lowering after pulsing and cross talk in the detector array.

Figure 5:
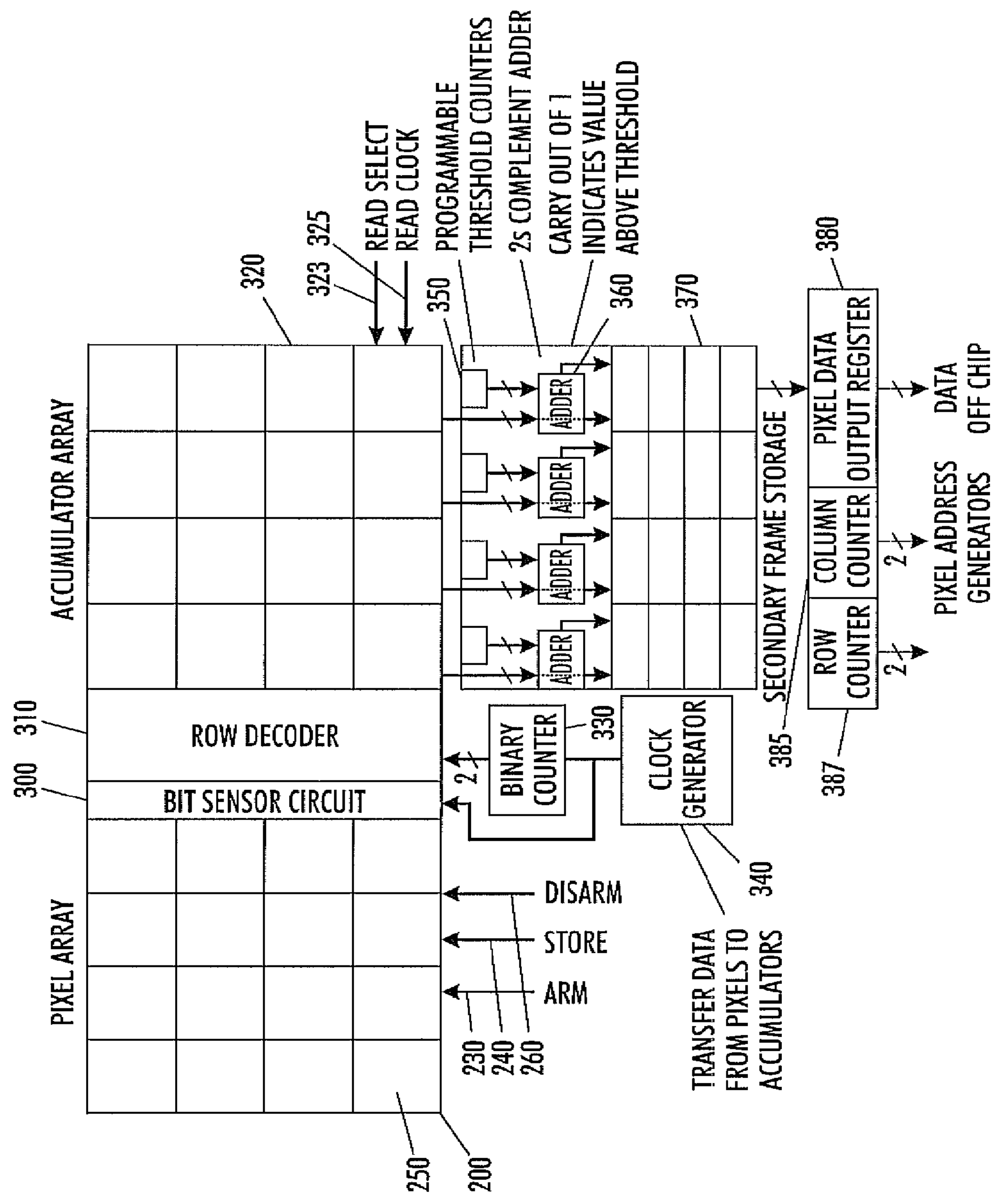
FIG. 5 illustrates another embodiment of a block diagram of a basic imager readout circuit for an array of avalanche photodiodes according to the concepts of the present invention.

FIG. 5 shows a basic block diagram of the readout circuit architecture that supports pixel circuit of FIG. 4. More specifically, FIG. 5 shows an extended architecture with secondary frame store to allow the transferring of the contents of accumulators very quickly on-chip, thereby facillitating true zero imaging deadtime. This means that the avalanche photodiodes can operate at high imaging duty cycles because data from the accumulators can be transferred to secondary frame storage during a single gate ON interval of the avalanche photodiodes.

As illustrated in FIG. 5, the pixels 250 are arrayed in a matrix 200 of n rows by m columns and are addressed using a row decoder 310 with n outputs. A photon-counting accumulator array 320 is also arrayed into a matrix of n rows by m columns accumulators. The photon-counting accumulator array 320 is shown being addressed by READ SELECT signal 323 and READ CLOCK signal 325.

A binary counter 330 drives the row decoder 310. Bitline-sensing circuits 300 placed between each column of pixels 250 and the associated accumulators of the accumulator array 320 quickly converts the precharged capacitance of the bitline (i.e., bitline 10 of FIG. 4) into a digital value of zero or one during read operations. A clock generator 340 drives the binary counter 330 and Bitline-sensing circuits 300.

Figure 6:
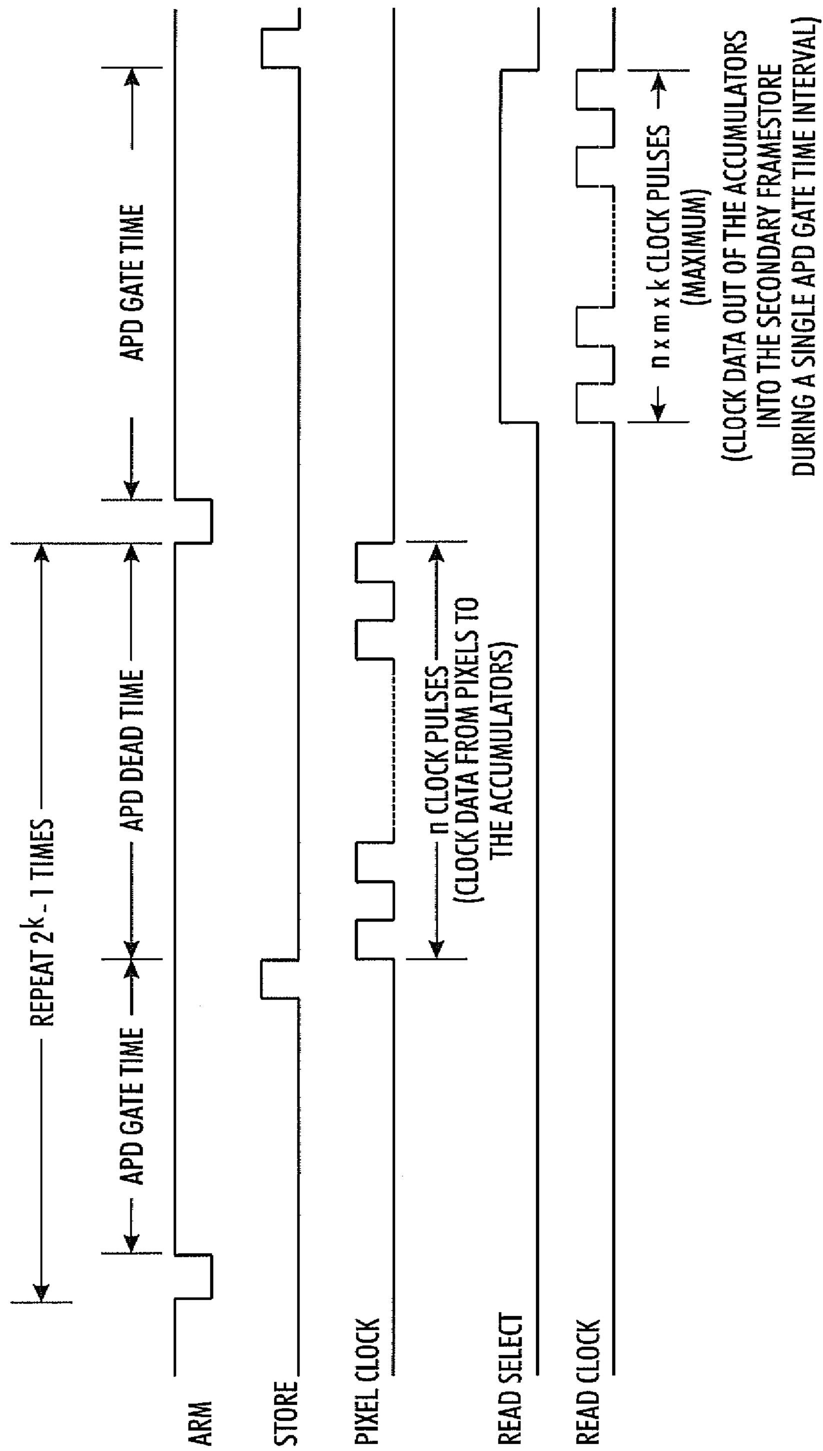
FIG. 6 illustrates control signal and clocking waveforms for the imager readout circuit of FIG. 5 according to the concepts of the present invention.

During normal imager operations, either an on-chip or off-chip programmable state machine supplies the control and clocking signals that are shown in FIG. 6 to the pixels 250 and the photon-counting accumulator array 320.

The avalanche photodiodes in the pixel array are gated ON synchronously when a global ARM signal (i.e., ARM signal 30 of FIG. 4) pulses low. At this point, each avalanche photodiode can be discharged by the avalanche multiplication of an electron-hole pair generated either by an absorbed photon or thermally.

A STORE signal (i.e., STORE signal 40 of FIG. 4), distributed synchronously to all the pixels 250, transitions low at the end of the gate time interval causing a data bit in the pixel to be stored. Subsequently the avalanche photodiode is disarmed, marking the start of the avalanche photodiode dead time.

As noted above, the avalanche photodiodes can operate at high imaging duty cycles because data from the accumulators can be transferred to secondary frame storage 370 of FIG. 5 during a single gate ON interval of the avalanche photodiodes as seen in the clocking waveforms of FIG. 6. Thus, the only time the avalanche photodiodes are not storing is when the avalanche photodiodes are disarmed because avalanches are being quenched, an inherent avalanche photodiode limitation, not because the accumulators are busy having their contents read-off chip.

The frame storage 370 includes a plurality of 2s complement adders 360 and programmable counters 350. When the 2s complement adders 360 carry out a one, it indicates that the value of the adder is greater than the threshold value.

The pixel data are then read out to a pixel data output register 380. A row counter 387 and column counter 385 are included to generate a pixel address.

Transferring accumulator data on-chip to the secondary framestore 370 of FIG. 5 can be done faster using less power than reading accumulator data off chip. The secondary framestore 370 can be a simple shift register with parallel and serial load capability or can be designed to implement signal processing functions as well directly on-chip as it receives photon count data from the accumulators.

Important functions such as thresholding, binning, edge detection and reading out intensity data of only pixel regions that are of interest as well as more sophisticated signal processing can be performed directly in the secondary frame storage section.

It is noted that an extension of this architecture includes two accumulator arrays where data from the pixels are transferred to the first accumulator array $2^k$-1 times, k being the number of bits in the counters of the accumulators, and then pixel data are transferred to the second accumualtor array while data from the first accumulator array is read off chip or processed on-chip.

For large arrays, reading data from the pixels to the accumulators could be speeded up by partitioning the rows of the pixels and accumulator arrays into blocks, by adding multiple parallel bitlines and sensing circuitry per pixel column. The size of each block is determined by the desired pixel revisit rate. The multiple blocks of rows could then be read out simultaneously by a larger number of decoders driven by a single binary counter.

The scaling is then limited mainly by clock skew, bitline wiring density, and increased power dissipation. At low imager frame rates, it is expected that power dissipation levels will be comparable to CCDs and CMOS APS devices. At higher frame rates exceeding 1000 frames per second, power dissipation might surpass CCD and CMOS APS devices on a per pixel basis if conventional circuit techniques and fabrication processes are employed. Power dissipation problems at high frame rates can be controlled by scaling circuits down to very deep submicron, low-voltage CMOS or by employing specialized BiCMOS or FD-SOI technology.

The accumulators of the present invention have two modes of operation. When data are to be read either off the chip or to the secondary framestorage for on-chip signal processing, the accumulator operates as a shift register that is daisy chained with the other accumulators either serially or in parallel to transfer the photon-count data out of the accumulator array when clocked by a READ CLOCK input signal. The accumulator accepts a decoder input as well, which is active when pixel data are read from the imaging array to the accumulator array. The accumulator can be any type of flip-flop-based counter k bits in length and able to count to $2^k$-1 photons. Considerations of silicon chip area, power dissipation, avalanche photodiode reset time, signal processing overhead, and ultimately the imaging application dictate the number of bits in the counter and therefore the dynamic range.

By physically placing the accumulator for the pixel outside the pixel area, the pixel size is kept small, thereby improving the resolution of the focal plane array. Controlling the avalanche photodiode gate and quench times in the array allows for high timing resolution and an adjustable dead time between reading out all the data from the pixel array to the accumulator array. The dead time of an avalanche photodiode is variable with times less than 100 ns for high-performance devices and occurs after each triggering or reset of an avalanche photodiode. During the dead time, the avalanche photodiode is blind to photons. The controlled clocking enables the avalanche photodiode dead time to be matched to the readout time.

Controlling the avalanche photodiode reset time locally within the pixel increases the pixel circuit complexity and size. Typically, after $2^k$-1 frames have been passed from the pixel array to the accumulators; the digital data in the accumulators are read off chip or to the secondary frame storage for further data processing and/or visual display by a computer or other system.

Figure 7:
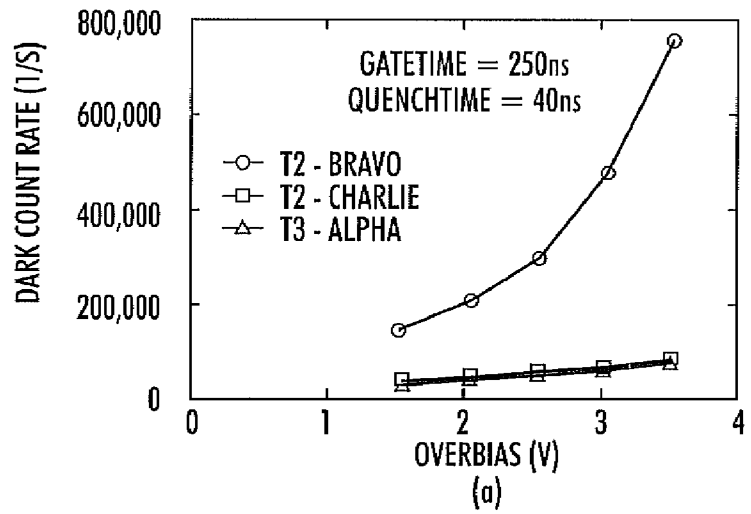
FIGS. 7-9 illustrate avalanche photodiode current rates as function of overbias, quench time, and gate time, respectively, according to the concepts of the present invention.
Figure 8:
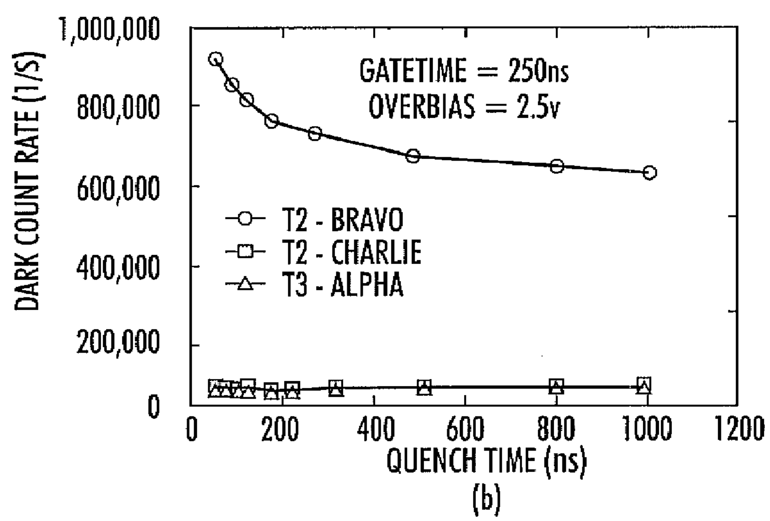
Figure 9:
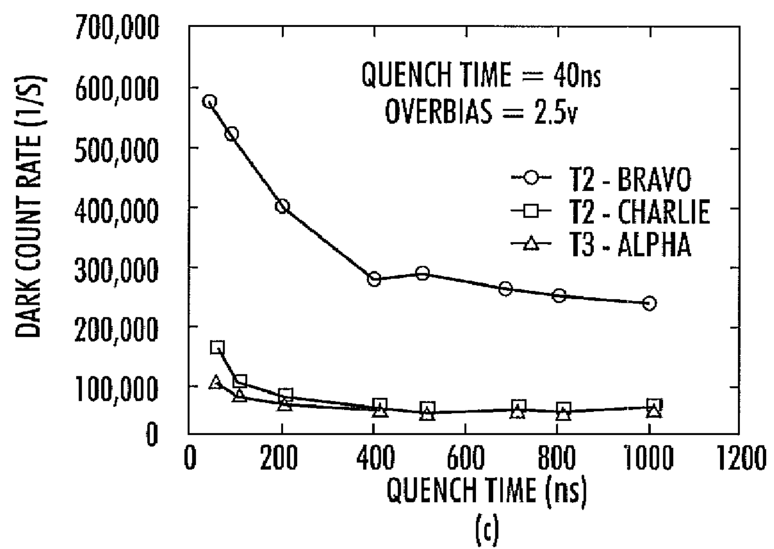

FIGS. 7-9 are plots of measured dark count rates as a function of avalanche photodiode overbias, quench time, and gate time, respectively. In FIG. 8, the dark count rate for T2-Bravo increases by approximately 50% as the avalanche photodiode quench time is reduced from 1 microsecond to 40 ns. Improved anode connections that reduce anode ringing in T2-Charlie and T3-Alpha reveal dramatic improvement of the dark count rate over T2-Bravo, indicating further that at 250-ns gate times reducing the avalanche photodiode quench time from 1000 to 40 ns yields almost no increase in the dark count rate.

In FIG. 9, the dark count rate increases as the gate time is shortened, indicating an elevated dark count rate in the early part of the gate-time interval. A large fraction of these events are triggered by electronic ringing due to packaging parasitics associated with the anode connections to the avalanche photodiodes. Focal plane arrays with better packaging and extra bypass capacitors have led to much lower and more uniform dark count rates.

Data from focal plane array Charlie, with measures to reduce anode ringing, show clear improvement over the earlier Bravo device. At 50-ns gate time, T2-Charlie exhibits a dark count rate of 200,000, while at 1000-ns gate time, the dark count rate is approximately 6 times less. T3-Alpha, by contrast, shows only a 3 to 1 increase in dark count rate for 50-ns gate time, while at longer gate times both T2 and T3 focal plane arrays have nearly identical dark count rates as would be expected for bump-bonded avalanche photodiodes from the same wafer.

T3-Alpha's dark count rate is 100,000 for 50-ns gate time and 40-ns quench time, while T2-Charlie's dark count rate is 200,000 for the same operating conditions. This difference is attributed to reduced anode ringing when the avalanche photodiodes are rearmed, since the T3 pixel circuit (FIG. 4) only disarms an avalanche photodiode after it has fired, while T2 (uses FIG. 1 pixels) disarms the entire detector array after a gate ON interval.

Therefore, when the array is rearmed less current is drawn in T3 than in T2 because only avalanche photodiodes that have fired are rearmed, leading to less ringing and therefore a dramatically reduced dark count rate at shorter gate times. The T2 and T3 chips support off-chip data readout clock rates in excess of 200 MHz.

Figure 10:
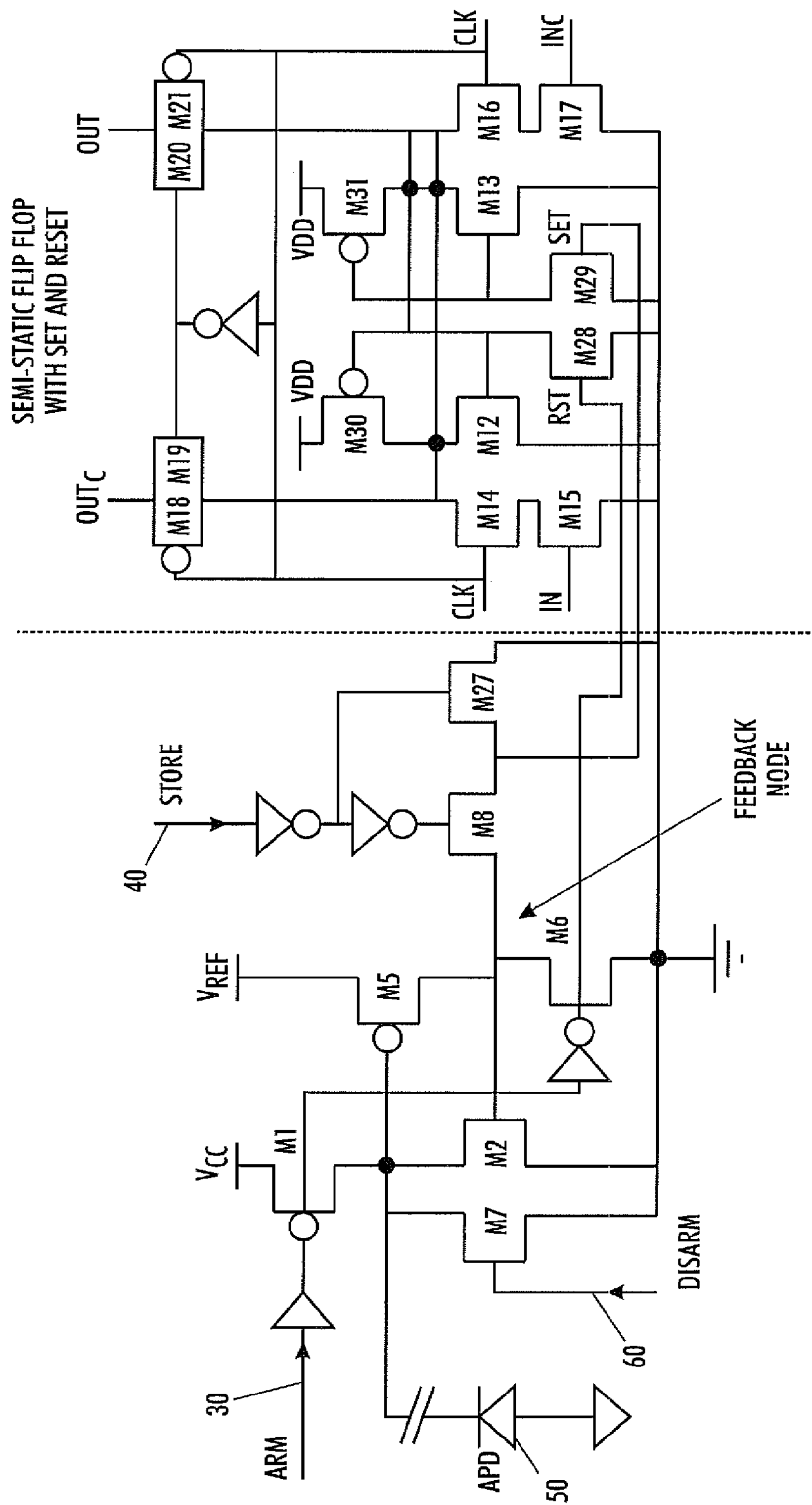
FIG. 10 illustrates a third embodiment of a circuit diagram of a 1-bit active quenching pixel according to the concepts of the present invention.

FIG. 10 illustrates another embodiment of the present invention that implements static data storage in the pixel using a highly compact semi-static D flip-flop with set pulse for storing a logic one if the avalanche photodiode is triggered by an event; chains the flip-flops in all the pixel columns together in series to form a long clockable shift register; and eliminates the decoders and bit sense circuits.

As illustrated in FIG. 10, an one-bit active quenching pixel circuit with static one bit data storage uses a semi-static D-flip flop whose output is connected to the input of the flip-flop of the following pixel beneath it in the same column.

The pixel circuit of FIG. 10 operates in a similar way to the active quenching pixel circuit shown earlier in FIG. 4 except that the single bit indicating whether the avalanche photodiode 50 fired is not stored dynamically on the gate of transistor M9 (FIG. 4) but rather in the D-flip flop (FIG. 10). When the avalanche photodiode 50 is armed the D-flip flop of FIG. 10 is reset when it receives an inverted ARM pulse on the gate of transistor M28 marked RST in FIG. 10. This causes the flip flop to store a logic 0.

If the avalanche photodiode fires during the microframe gate-time while it is armed, a rising edge will be generated on the gate of transistor M29 named SET causing the D-flip flop to store a logic 1 indicating that the avalanche photodiode fired. When at the end of the avalanche photodiode gate-time, the STORE signal transitions from high to low, the gate of M29 is cleared to ground because n-channel transistor M27 is turned ON and it will conduct charge to ground from the gate of M29.

If the avalanche photodiode does not avalanche during the gate-time interval, the D-flip flop is never set and it will continue to store a logic 0 after the transition from high to low logic of the STORE pulse marking the end of the avalanche photodiode gate-time. At this point the 1-bit data indicating whether the avalanche photodiode avalanched or not during the avalanche photodiode gate-time, can be rapidly transferred to the framestore accumulators using the on-chip state machines shown in FIG. 11.

The flip flop of FIG. 10 is a highly compact semi-static D-flip flop that is positive edge triggered and can be clocked using a true single phase clock. It is a master-slave flip-flop that does not suffer from race conditions and has complementary outputs and inputs. It consists of a cross-coupled inverter pair made up of p-channel transistor M30 and n-channel M12 and p-channel M31 and n-channel M13.

Race conditions are prevented by pass gates consisting of p-channel M21 and n-channel M20 for the true output and p-channel M18 and n-channel M19 for the complementary output. When a rising clock edge occurs at the gates of n-channels M14 and M16, the values on the flip flop input are evaluated and the pass gates are placed in a non-conducting state to prevent changes occurring in the state of the cross coupled inverter from being reflected at the flip-flop outputs until a falling clock edge, thereby preventing race conditions.

Pull down transistors M14, M15, M16, and M17, are used to change the state of the cross-coupled inverter pair to reflect the state of the flip flop inputs when the clock is logic high. Thus, when a logic 1 is placed on the gate of M15 and a complementary logic 0 is placed on the gate of complementary input M17, when a rising clock edge appears at the CLK terminal, n-channel transistors M14 and M15 conduct in series and the state of the cross coupled inverter will either remain unchanged if it previously stored a logic 1 or will change from a logic 0 to a logic 1 reflecting the inputs on the gates of M15 and M17.

When the falling clock edge appears, the pass gates will be made to conduct and the output terminal (OUT) will become logic 1 and complementary (OUTC) will become logic 0. As a note, this flip-flop is semi-static because the data on the outputs is static or fully stable only when the clock input is in a logic low state. When the clock is high at the CLK terminals of the flip flop, the pass gates are not conducting and so the output values OUT and OUTC are stored capacitively on the logic gates of subsequent circuitry connected to the flip flop outputs. Thus, it is important that the clock frequency used to operate the flip flops is not reduced to the point where output data is lost due to the dynamic nature of storage of the flip flop output values while the clock is logic high.

When the clock is logic zero, there is a low impedance path through the conducting pass gates between the flip flop out puts to either $V_{DD}$ or Ground so the output values are stable indefinitely as long as logic power is applied to the circuit. Only when the clock is logic high are the pass gates not conducting and so the flip flop outputs are electrically isolated from $V_{DD}$ and Ground, their values being retained dynamically by capacitive storage. This compact semi-static D-flip flop has RESET and SET transistors M28 and M29 that allow resetting the flip flop to logic 0 or setting the flip flop to logic 1 asynchronously to the flip flop clock.

Figure 11:
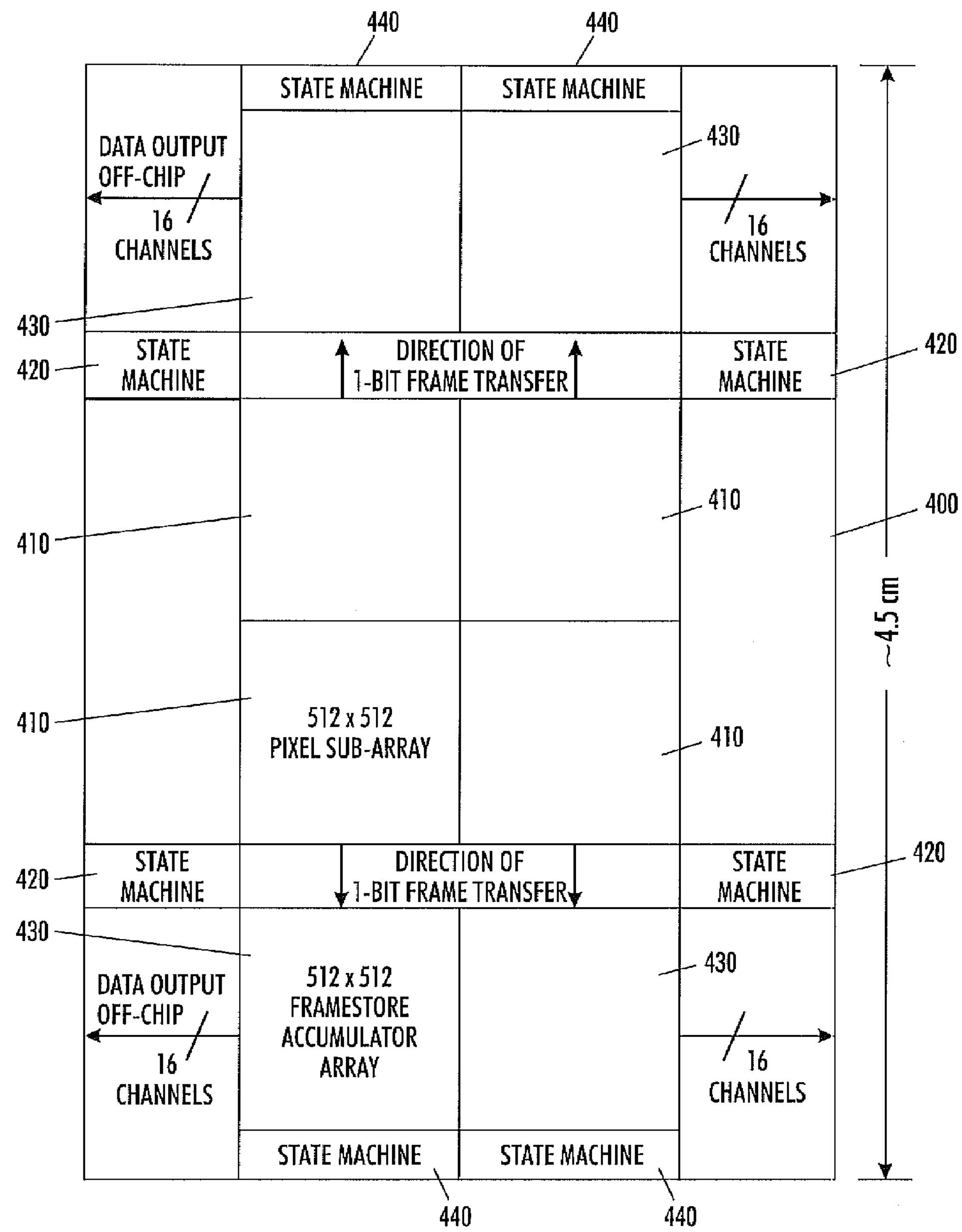
FIG. 11 illustrates a third embodiment of a block diagram of a basic imager readout circuit for an array of avalanche photodiodes according to the concepts of the present invention.

FIG. 11 shows the entire imager chip 400 as a block diagram when scaled to 1024×1024 size with four separate quadrants 410 of 512×512 pixels, each transferring 1-bit microframes to their own respective framestore arrays of accumulators 440 using an on-chip 2 Ghz microframe transfer clock and state machine 420 (implementable in 0.35 micron bulk CMOS).

Avalanche photodiode quench times of 256 ns are supported for the array. Even shorter quench times can be supported if instead of one shift register per pixel column, two parallel shift registers per column are used. The minimum supported avalanche photodiode quench time in that case would be 128 ns. Three parallel shift registers per pixel column would support avalanche photodiode quench times of less than 100 ns. These improvements to the architecture enable the design and fabrication of a reliable 1024×1024 pixel readout circuit with 20 micron pixel pitch.

Assuming the imager is designed as shown in FIG. 11, using 4-bit binary counters in the framestore accumulators with four readout ports per 512×512 pixel quadrant for a total of 16 output channels per 512×512 sub-array, frame rates of 3000 per second with 4-bit resolution could be expected when readout at 200 MHz into FIFO buffers using an on-chip state machine 440. Further integration of frames to yield higher resolution images would be performed off-chip.

Figure 12:
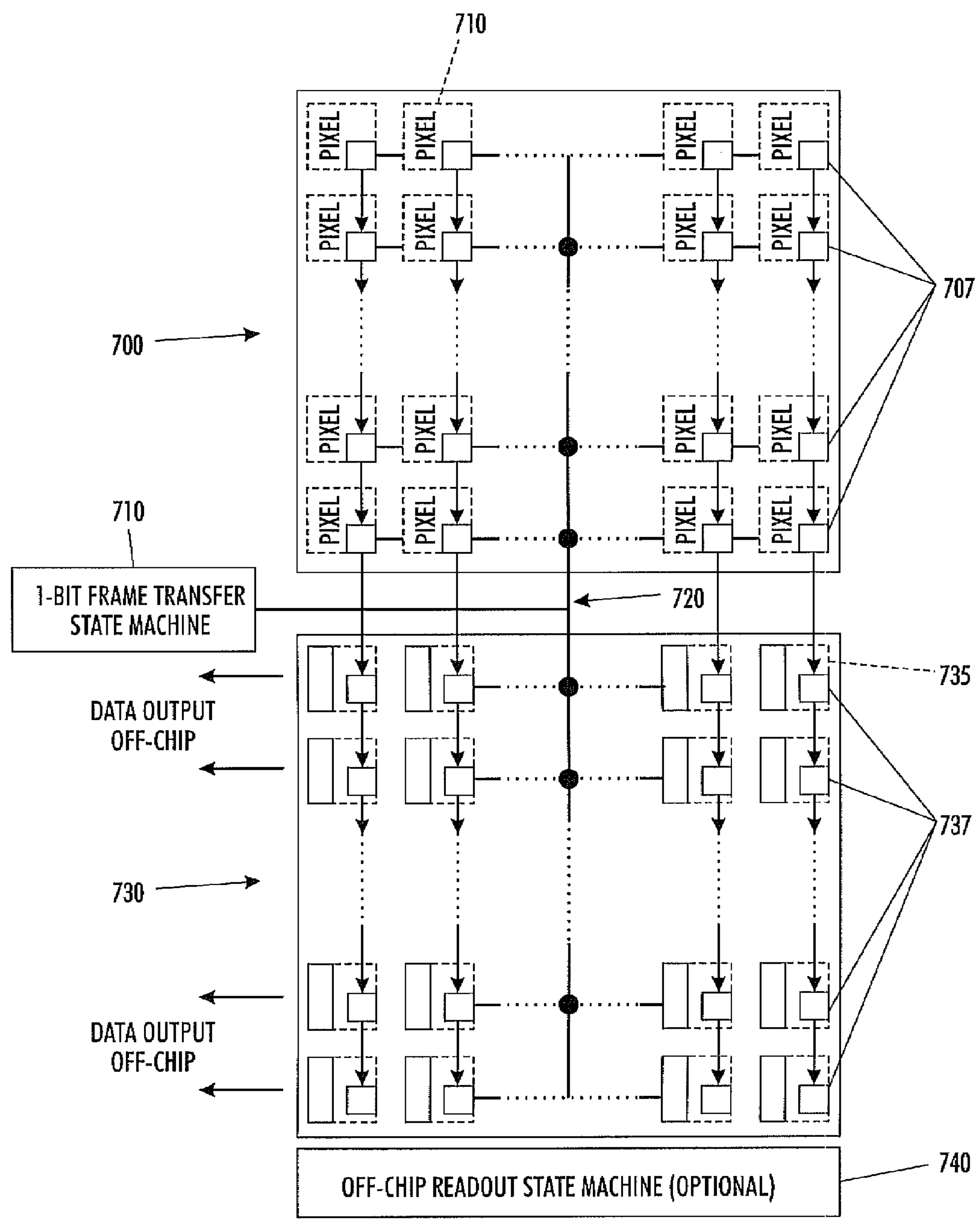
FIG. 12 illustrates a further embodiment of a block diagram of a basic imager readout circuit for an array of avalanche photodiodes according to the concepts of the present invention.
Figure 13:
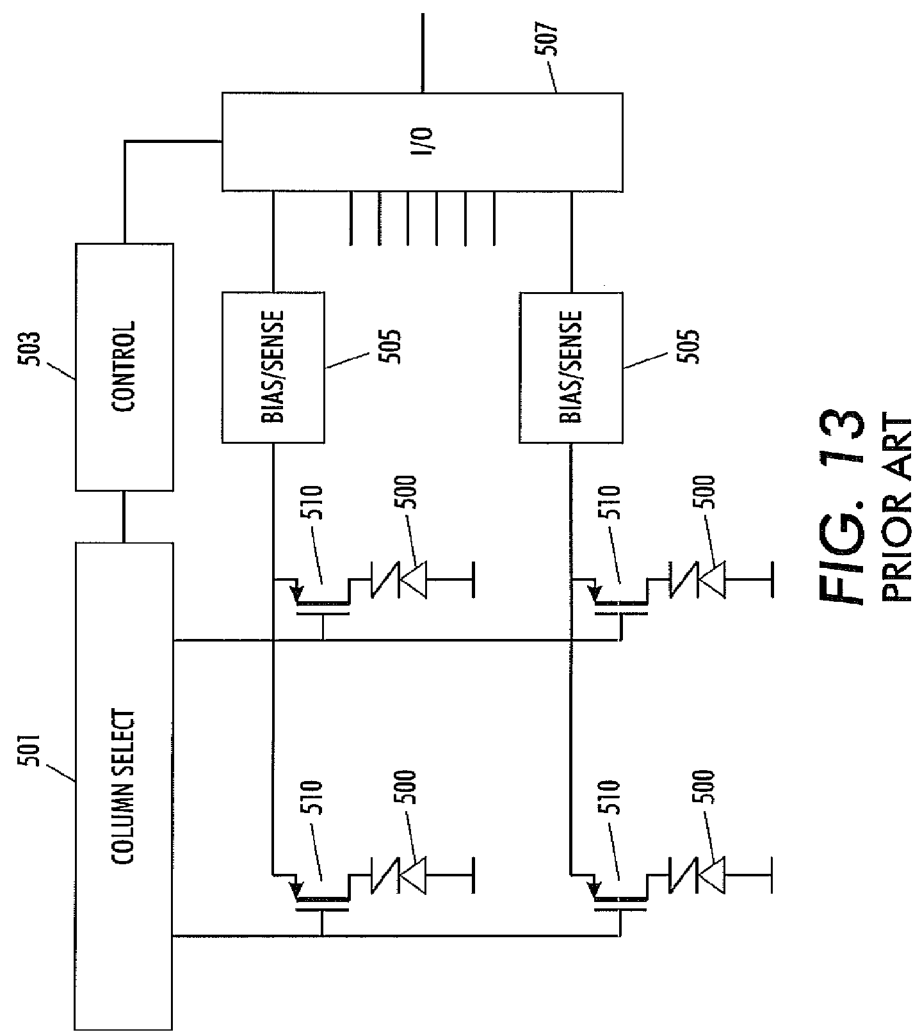
FIG. 13 illustrates a prior art MOSFET matrix architecture for a two-dimensional array of avalanche photodiodes in a photon-counting environment.
Figure 14:
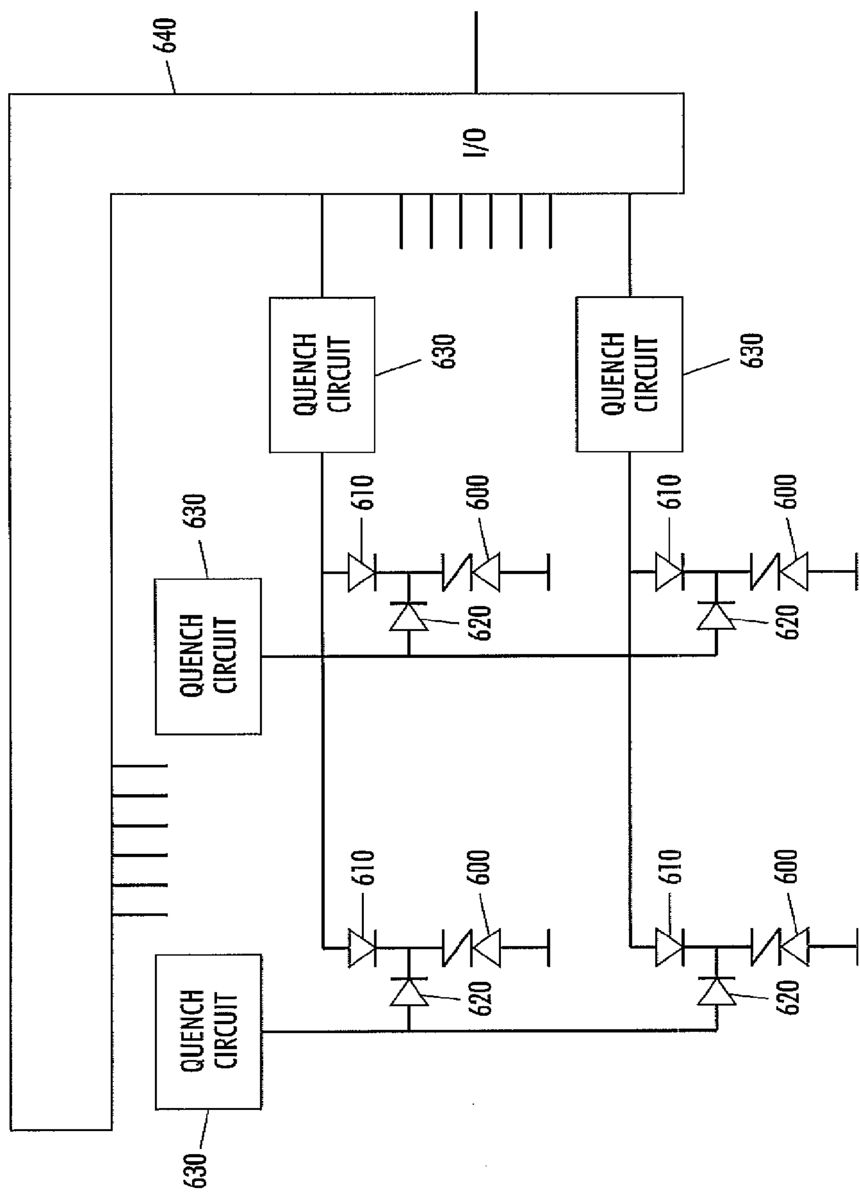
FIG. 14 illustrates a prior art diode matrix architecture for a two-dimensional array of avalanche photodiodes in a photon-counting environment.

In the functional block diagram of FIG. 11, for the example large format 1024×1024 pixel readout integrated circuit, the decoders and bit sense circuits are eliminated and the one bit data is serially shifted down to the accumulators in the framestore through the shift registers formed by chaining together D-flip flops along columns in the pixel array. There are also two sets of four state machines (420 and 440) for controlling movement of data in the imager readout circuit. The first set of 4 state machines 420 controls the very high speed transfer of 1-bit data from the pixels 410 to the framestore accumulators 430, while the second set of 4 state machines 440 controls the high rate clocking of data from the framestore accumulators off-chip to FIFO or DSP data sinks. FIG. 12 shows in more detail how this is done.

As illustrated in FIG. 12, 1-bit pixel data from a pixel 705 of a pixel sub-array 700 is clocked down along a clockable serial shift register formed by connecting the D-flip flop 707 outputs to the inputs of adjacent D-flip-flops 707 in a pixel column. The 1-bit pixel data is then shifted down through the clockable shift register, the clockable shift register being formed from the intra-column serially chained D-flip-flops 707, to the framestore accumulators 731 of framestore accumulator sub-array 730. Each framestore accumulator 731 includes a counter 735 that is incremented if a logic one was shifted down to it from its corresponding pixel. Otherwise, if a logic 0 is shifted down from the pixel, the counter retains its previous value reflecting the fact that the avalanche photodiode did not avalanche during its gate-time.

The counters 735 in the framestore accumulator sub-array 730 can be represented as k-bit counters that should, in addition to counting, be able to shift data in parallel and also serially to allow shifting data out of the framestore accumulator sub-array 730 off-chip more easily and quickly. It is noted that each counter 735 always receives 1-bit data from the same pixel.

As further illustrated in FIG. 12, each framestore accumulator 731 also includes a D-flip flop 737. The D-flip flops 737 form another clockable serial shift register by connecting the D-flip flop 737 outputs to the inputs of adjacent D-flip-flops 737 in a pixel column.

Lastly, the embodiment illustrated in FIG. 12 includes a 1-bit frame transfer state machine 710 that generates a predetermined number of clock periods associated i-th the number of pixels in the sub-array to shift all pixel bits per column to the framestore accumulator sub-array 730. These clock signals from the 1-bit frame transfer state machine 710 are carried on a clock distribution network 720 to enable 1-bit transfer from the pixel sub-array 700 to the framestore accumulator sub-array 730.

Optionally, an off-chip readout state machine 740 may be included to enable the data to be clocked off-chip. In alternative embodiment, the accumulator counters 735 should have the capability to parallel and serial shift data in addition to counting so that data from the counters can be easily clocked off-chip.

If 20 micron pitch square pixels are used in the illustration of FIG. 12, 4-bit binary counters are recommended for use in the framestore to make the accumulator array size approximately the same as the pixel array size. If 4-bits in the counter are not sufficient for the application, frames can be further integrated off-chip on a digital signal processor or personal computer to obtain higher image resolution and greater dynamic range.

After the one bit pixel data is serially shifted down to the framestore accumulators $2^k$-1 number of times where k is the number of bits in the counter, the data from the accumulators can be transferred off chip at high speed using a dedicated on-chip state machine. Data can be burst clocked off-chip to a FIFO at very high rate greater than 200 Mhz in order to free the counters quickly so they can be ready to start integrating 1-bit pixel data again.

Transferring data quickly from the accumulators off-chip is important to be able to obtain high imaging duty cycles, because when the accumulators are busy shifting data off-chip, they cannot count photons, therefore it is important to transfer imager data off chip as rapidly as possible. The clocking waveforms shown in FIG. 3 apply broadly to the circuit illustrated in FIGS. 11 and 12 using the pixel circuit of FIG. 10, with the added mention that on-chip state machines rather than off-chip signals are used to effect 1-bit data transfer from the pixel array to the accumulator array and also to transfer data off-chip to high speed FIFO memories or DSPs from the framestore accumulators.

These improvements to the circuitry do not change the basic scalable readout circuit architecture but facilitate a way to more easily and reliably implement the scalable readout integrated circuit architecture concepts of the present invention. This readout circuit architecture for large format all digital photon counting Geiger-mode avalanche photodiode intensity imagers makes it possible to more easily and reliably implement these all solid-state monolithic imagers.

The present invention enables an all-digital monolithic photon-counting intensity imager based on a solid-state focal plane array of Geiger-mode avalanche photodiodes, integrated to a CMOS readout circuit. This imager outperforms with respect to low-light sensitivity and high-speed applications requiring real-time continuous data acquisition and signal processing.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method of converting detection of a photon to a digital value, comprising:

(a) sensing an avalanche event in an avalanche photodiode of an active quenching pixel; and (b) storing, in response to the sensed avalanche event, a single bit digital value in the pixel.

2. The method as claimed in claim 1, further comprising:

(c) distributing an arming signal to all avalanche photodiode pixels within the array synchronously; and (d) distributing a storing signal to all avalanche photodiode pixels within the array synchronously;

said synchronous distribution of the arming signal and the storing signal enabling a timing resolution indicating exactly when an avalanche photodiode detects a photon.

3. The method as claimed in claim 1, further comprising:

(c) distributing a disarming signal to all avalanche photodiode pixels within the array synchronously to set deterministic conditions for the entire array.

4. The method as claimed in claim 2, further comprising:

(e) distributing a disarming signal to all avalanche photodiode pixels within the array synchronously to set deterministic conditions for the entire array.

5. The method as claimed in claim 1, further comprising:

(c) transferring the stored single bit digital value in the pixel to an accumulator located outside of the array of pixels.

6. The method as claimed in claim 1, further comprising:

(c) transferring the stored single bit digital value in the pixel during a dead time of the avalanche photodiode.

7. The method as claimed in claim 1, further comprising:

(c) transferring the stored single bit digital value in the pixel to an accumulator located outside of the array of pixels during a dead time of the avalanche photodiode.

8. The method as claimed in claim 1, further comprising:

(c) transferring the stored single bit digital value in the pixel to an accumulator located outside of the array of pixels when the avalanche photodiode is being quenched.

9. The method as claimed in claim 5, further comprising:

(d) transferring the stored single bit digital value in the accumulator to a secondary storage device during a single gate ON interval of the avalanche photodiode.

10. The method as claimed in claim 6, further comprising:

(d) transferring the stored single bit digital value in the accumulator to a secondary storage device during a single gate ON interval of the avalanche photodiode.

11. The method as claimed in claim 7, further comprising:

(d) transferring the stored single digital bit value in the accumulator to a secondary storage device during a single gate ON interval of the avalanche photodiode.

12. A method of converting photons detected by an array of pixels to single-bit digital values, each pixel having an avalanche photodiode, comprising:

(a) sensing an avalanche event in the avalanche photodiode of each active quenching pixel; and (b) storing, in response to the sensed avalanche event, a single bit digital value in the pixel.

13. An imager having a photon-counting Geiger-mode avalanche photodiode intensity imaging array, comprising:

an array of pixels, each having an avalanche photodiode;

an array of accumulators, each accumulator being associated with a pixel;

a row decoder circuit to address a pixel row within said array of pixels; and a bit sensing circuit to convert a precharged capacitance into a digital value during read operations;

said pixels sensing an avalanche event in its associated avalanche photodiode and storing, in response to the sensed avalanche event, a single bit digital value therein.

14. The imager as claimed in claim 13, further comprising:

a control circuit to distribute an arming signal to all avalanche photodiode pixels within the array synchronously and to distribute a storing signal to all avalanche photodiode pixels within the array synchronously.

15. The imager as claimed in claim 13, further comprising:

a control circuit to distribute an arming signal to all avalanche photodiode pixels within the array synchronously, to distribute a storing signal to all avalanche photodiode pixels within the array synchronously, and to distribute a disarming signal to all avalanche photodiode pixels within the array synchronously.

16. The imager as claimed in claim 13, wherein said accumulator is located outside of the array of pixels.

17. The imager as claimed in claim 13, wherein the stored single bit digital value in said pixel is transferred to said accumulator during a dead time of the avalanche photodiode.

18. The imager as claimed in claim 13, wherein the stored single bit digital value in said pixel is transferred to said accumulator when the avalanche photodiode is being quenched.

19. The imager as claimed in claim 13, wherein said single bit digital value is stored when said avalanche photodiode is disarmed.

20. The imager as claimed in claim 13, wherein said single bit digital value is stored without disarming said avalanche photodiode.

21. The imager as claimed in claim 17, further comprising:

a secondary storage device;

said stored single bit digital value in said accumulator is transferred to said secondary storage device during a single gate ON interval of the avalanche photodiode.

22. An imager having a photon-counting Geiger-mode avalanche photodiode intensity imaging array, comprising:

an array of pixels, each having an avalanche photodiode;

an array of accumulators, each accumulator being associated with a pixel;

said pixels sensing an avalanche event in its associated avalanche photodiode and storing, in response to the sensed avalanche event, a single bit digital value therein;

a first set of state machines to control a transfer of said single bit digital value from said pixel to said accumulator; and a second set of state machines to control a transfer of said single bit digital value from said accumulator off-chip.

23. The imager as claimed in claim 22, wherein said first set of state machines distribute an arming signal to all avalanche photodiode pixels within the array synchronously and distribute a storing signal to all avalanche photodiode pixels within the array synchronously.

24. The imager as claimed in claim 22, wherein said first set of state machines distribute an arming signal to all avalanche photodiode pixels within the array synchronously, distribute a storing signal to all avalanche photodiode pixels within the array synchronously, and distribute a disarming signal to all avalanche photodiode pixels within the array synchronously.

25. The imager as claimed in claim 22, wherein said accumulator is located outside of the array of pixels.

26. The imager as claimed in claim 22, wherein the stored single digital bit value in said pixel is transferred to said accumulator during a dead time of the avalanche photodiode.

27. The imager as claimed in claim 22, wherein the stored single digital bit value in said pixel is transferred to said accumulator when the avalanche photodiode is being quenched.

28. A photon counting intensity imager, comprising:

a Geiger-mode avalanche photodiode pixel imaging array; and a scalable readout integrated circuit; wherein said Geiger-mode avalanche photodiode pixel imaging array comprises an array of pixels, each having an avalanche photodiode, said pixels sensing an avalanche event in its associated avalanche photodiode and storing, in response to the sensed avalanche event, a single bit digital value therein.

29. The photon counting intensity imager as claimed in claim 28, wherein the photon counting intensity imager is solid state.

30. The photon counting intensity imager as claimed in claim 28, wherein the photon counting intensity imager is monolithic.

31. The photon counting intensity imager as claimed in claim 28, wherein said scalable readout integrated circuit comprises:

an array of accumulators, each accumulator being associated with a pixel; a row decoder circuit to address a pixel row within said array of pixels; and a bit sensing circuit to convert a precharged capacitance into a digital value during read operations.

32. The photon counting intensity imager as claimed in claim 28, wherein said scalable readout integrated circuit comprises:

an array of accumulators, each accumulator being associated with a pixel; a first set of state machines to control a transfer of said single bit digital value from said pixel to said accumulator; and a second set of state machines to control a transfer of said single bit digital value from said accumulator off-chip.

33. The photon counting intensity imager as claimed in claim 30, wherein said Geiger-mode avalanche photodiode pixel imaging array is a focal plane array of pixels.

34. The photon counting intensity imager as claimed in claim 30, wherein said Geiger-mode avalanche photodiode pixel imaging array comprises an array of pixels, each having an avalanche photodiode and a pixel D-flip flop circuit, intra-dimensional pixel D-flip flops being serially chained together to form a plurality of pixel clockable shift registers, said pixels sensing an avalanche event in its associated avalanche photodiode and storing, in response to the sensed avalanche event, a single bit digital value therein, and said scalable readout integrated circuit comprises an array of accumulators, each accumulator being operatively connected to one of said plurality of pixel clockable shift registers, each accumulator being associated with a pixel.

35. The photon counting intensity imager as claimed in claim 31, further comprising:

a control circuit to distribute an arming signal to all avalanche photodiode pixels within the array synchronously and to distribute a storing signal to all avalanche photodiode pixels within the array synchronously.

36. The photon counting intensity imager as claimed in claim 31, further comprising:

a control circuit to distribute an arming signal to all avalanche photodiode pixels within the array synchronously, to distribute a storing signal to all avalanche photodiode pixels within the focal plane array synchronously, and to distribute a disarming signal to all avalanche photodiode pixels within the array synchronously.

37. The photon counting intensity imager as claimed in claim 31, wherein said accumulator is located outside of the array of pixels.

38. The photon counting intensity imager as claimed in claim 31, wherein the stored single bit digital value in said pixel is transferred to said accumulator during a dead time of the avalanche photodiode.

39. The photon counting intensity imager as claimed in claim 31, wherein the stored single bit digital value in said pixel is transferred to said accumulator when the avalanche photodiode is being quenched.

40. The photon counting intensity imager as claimed in claim 31, wherein said single bit digital value is stored when said avalanche photodiode is disarmed.

41. The photon counting intensity imager as claimed in claim 31, wherein said single bit digital value is stored without disarming said avalanche photodiode.

42. The photon counting intensity imager as claimed in claim 38, further comprising:

a secondary storage device;

said stored single bit digital value in said accumulator is transferred to said secondary storage device during a single gate ON interval of the avalanche photodiode.

43. The photon counting intensity imager as claimed in claim 32, wherein said first set of state machines distribute an arming signal to all avalanche photodiode pixels within the array synchronously and distribute a storing signal to all avalanche photodiode pixels within the array synchronously.

44. The photon counting intensity imager as claimed in claim 32, wherein said first set of state machines distribute an arming signal to all avalanche photodiode pixels within the array synchronously, distribute a storing signal to all avalanche photodiode pixels within the array synchronously, and distribute a disarming signal to all avalanche photodiode pixels within the array synchronously.

45. The photon counting intensity imager as claimed in claim 32, wherein said accumulator is located outside of the array of pixels.

46. The photon counting intensity imager as claimed in claim 32, wherein the stored single digital bit value in said pixel is transferred to said accumulator during a dead time of the avalanche photodiode.

47. The photon counting intensity imager as claimed in claim 32, wherein the stored single digital bit value in said pixel is transferred to said accumulator when the avalanche photodiode is being quenched.

48. An imager having a photon-counting Geiger-mode avalanche photodiode intensity imaging array, comprising:

an array of pixels, each having an avalanche photodiode and a pixel D-flip flop circuit, intra-dimensional pixel D-flip flops being serially chained together to form a plurality of clockable pixel shift registers; and an array of accumulators, each accumulator being operatively connected to one of said plurality of clockable pixel shift registers, each accumulator being associated with a pixel;

said pixels sensing an avalanche event in its associated avalanche photodiode and storing, in response to the sensed avalanche event, a single bit digital value therein.

49. The imager as claimed in claim 48, wherein said intra-dimensional pixel D-flip flops are intra-column pixel D-flip flops.

50. The imager as claimed in claim 48, wherein said intra-dimensional pixel D-flip flops are intra-row pixel D-flip flops.

51. The imager as claimed in claim 48, wherein each accumulator comprises a counter and an accumulator D-flip flop circuit, intra-dimensional accumulator D-flip flops being serially chained together to form a plurality of accumulator clockable shift registers.

52. The imager as claimed in claim 48, further comprising:

a control circuit to distribute an arming signal to all avalanche photodiode pixels within the array synchronously and to distribute a storing signal to all avalanche photodiode pixels within the array synchronously.

53. The imager as claimed in claim 48, further comprising:

a control circuit to distribute an arming signal to all avalanche photodiode pixels within the array synchronously, to distribute a storing signal to all avalanche photodiode pixels within the array synchronously, and to distribute a disarming signal to all avalanche photodiode pixels within the array synchronously.

54. The imager as claimed in claim 48, wherein said accumulator is located outside of the array of pixels.

55. The imager as claimed in claim 48, wherein the stored single bit digital value in said pixel is transferred to said accumulator during a dead time of the avalanche photodiode.

56. The imager as claimed in claim 48, wherein the stored single bit digital value in said pixel is transferred to said accumulator when the avalanche photodiode is being quenched.

57. The imager as claimed in claim 48, wherein said single bit digital value is stored when said avalanche photodiode is disarmed.

58. The imager as claimed in claim 48, wherein said single bit digital value is stored without disarming said avalanche photodiode.

59. The imager as claimed in claim 48, wherein said array of pixels is a focal plane array of pixels.

60. An imager having a photon-counting Geiger-mode avalanche photodiode intensity imaging array, comprising:

an array of pixels, each having an avalanche photodiode and a pixel D-flip flop circuit, intra-dimensional pixel D-flip flops being serially chained together to form a plurality of clockable pixel shift registers;

an array of accumulators, each accumulator being operatively connected to one of said plurality of clockable pixel shift registers, each accumulator being associated with a pixel; and a first set of state machines to control a transfer of said single bit digital value from said pixel to said accumulator;

said pixels sensing an avalanche event in its associated avalanche photodiode and storing, in response to the sensed avalanche event, a single bit digital value therein.

61. The imager as claimed in claim 60, further comprising:

a second set of state machines to control a transfer of said single bit digital value from said accumulator off-chip.

62. The imager as claimed in claim 60, wherein said first set of state machines distribute an arming signal to all avalanche photodiode pixels within the array synchronously and distribute a storing signal to all avalanche photodiode pixels within the array synchronously.

63. The imager as claimed in claim 60, wherein said first set of state machines distribute an arming signal to all avalanche photodiode pixels within the array synchronously, distribute a storing signal to all avalanche photodiode pixels within the array synchronously, and distribute a disarming signal to all avalanche photodiode pixels within the array synchronously.

64. The imager as claimed in claim 60, wherein said intra-dimensional pixel D-flip flops are intra-column pixel D-flip flops.

65. The imager as claimed in claim 60, wherein said intra-dimensional pixel D-flip flops are intra-row pixel D-flip flops.

66. The imager as claimed in claim 60, wherein each accumulator comprises a counter and an accumulator D-flip flop circuit, intra-dimensional accumulator D-flip flops being serially chained together to form a plurality of accumulator clockable shift registers.

67. The imager as claimed in claim 60, wherein said accumulator is located outside of the focal plane array of pixels.

68. The imager as claimed in claim 60, wherein the stored single digital bit value in said pixel is transferred to said accumulator during a dead time of the avalanche photodiode.

69. The imager as claimed in claim 60, wherein the stored single digital bit value in said pixel is transferred to said accumulator when the avalanche photodiode is being quenched.

70. The imager as claimed in claim 60, wherein said array of pixels is a focal plane array of pixels.

* * * * *